US008293853B2

(12) United States Patent
Parrish et al.

(10) Patent No.: US 8,293,853 B2
(45) Date of Patent: Oct. 23, 2012

(54) RAW MATERIAL EFFICIENCY METHOD AND PROCESS

(75) Inventors: John R. Parrish, Charleston, WV (US); Jeffrey B. Drabish, Elkview, WV (US); Oscar M. Longoria, Jr., Rockport, TX (US); James L. Swecker, II, Clendenin, WV (US)

(73) Assignee: Univation Technologies, LLC, Houston, TX (US)

( * ) Notice: Subject to any disclaimer, the term of this patent is extended or adjusted under 35 U.S.C. 154(b) by 60 days.

(21) Appl. No.: 12/919,161

(22) PCT Filed: Feb. 27, 2009

(86) PCT No.: PCT/US2009/035575
§ 371 (c)(1),
(2), (4) Date: Aug. 24, 2010

(87) PCT Pub. No.: WO2010/014266
PCT Pub. Date: Feb. 4, 2010

(65) Prior Publication Data
US 2010/0331499 A1    Dec. 30, 2010

(51) Int. Cl.
*C08F 2/00*    (2006.01)
*F27B 15/08*    (2006.01)
*G05B 21/00*    (2006.01)
(52) U.S. Cl. ............ 526/74; 526/88; 422/145; 422/147; 700/269
(58) Field of Classification Search .................. 422/145, 422/147; 526/74, 88; 700/269
See application file for complete search history.

(56) References Cited

U.S. PATENT DOCUMENTS

| 3,551,403 | A | * | 12/1970 | Hoffait et al. .................. 526/59 |
| 3,601,588 | A | | 8/1971 | Bristol |
| 3,602,701 | A | | 8/1971 | Boyd |
| 4,003,712 | A | | 1/1977 | Miller |
| 4,032,391 | A | | 6/1977 | Moked et al. |
| 4,129,701 | A | | 12/1978 | Jezl |
| 4,255,542 | A | | 3/1981 | Brown et al. |
| 4,293,673 | A | | 10/1981 | Hamer et al. |
| 4,302,565 | A | | 11/1981 | Goeke et al. |

(Continued)

FOREIGN PATENT DOCUMENTS
EP    0071430 A2    2/1983
(Continued)

OTHER PUBLICATIONS

*Soil compaction handbook.* (Jan. 23, 2008). Retrieved from http://www.concrete-catalog.com/soil_compaction.html.

*Primary Examiner* — William Cheung
(74) *Attorney, Agent, or Firm* — Jennifer A. Schmidt (57) ABSTRACT

A method and apparatus are disclosed for controlling product discharge from a fluidized bed reactor and for minimizing the loss of the unreacted monomer in the fluidizing gas upon removing the solid polymer product from the reactor. The method and apparatus utilize at least one detector in the product tank or its vent line and a control system in communication with the detector and the product tank fill valve, along with certain algorithms, to adjust by an iterative process, the product discharge time, thereby maximizing resin fill in the product tank and minimizing the lost reactor gas volume.

8 Claims, 3 Drawing Sheets

U.S. PATENT DOCUMENTS

| | | |
|---|---|---|
| 4,372,758 A | 2/1983 | Bobst |
| 4,535,134 A | 8/1985 | de Lorenzo et al. |
| 4,621,952 A | 11/1986 | Aronson |
| 5,453,471 A | 9/1995 | Bernier |
| 5,744,556 A | 4/1998 | Keller et al. |
| 5,818,732 A | 10/1998 | Vanderwilt |
| 6,255,411 B1 * | 7/2001 | Hartley et al. .................. 526/88 |
| 6,472,483 B1 | 10/2002 | Goode et al. |
| 7,647,125 B2 | 1/2010 | Melanson |
| 2009/0214395 A1 * | 8/2009 | Parrish et al. ................. 422/145 |

FOREIGN PATENT DOCUMENTS

| | | |
|---|---|---|
| WO | WO-2006007974 A1 | 1/2006 |
| WO | WO-2007102942 A1 | 9/2007 |
| WO | WO-2008045172 A1 | 4/2008 |

* cited by examiner

RAW MATERIAL EFFICIENCY METHOD AND PROCESS

FIELD OF THE INVENTION

The disclosure is related to the production of polyolefins in fluidized beds, and particularly to methods of removing polymerized product from a fluidized bed reactor at a desired rate of production while conserving the fluidizing gas.

BACKGROUND OF THE INVENTION

A longstanding problem in the production of polyolefins in fluidized bed reactors is the loss of the unreacted monomer in the fluidizing gas as a consequence of removing the solid polymer product from the reactor. The particles of polymer or resin product are generally removed by passing them into a product tank connected with the fluidized bed reactor, which usually occurs under positive gas pressure assisted by gravity, during which the particles are still somewhat entrained in or surrounded by the gaseous atmosphere of the reactor. Regardless of the system of valves through which solid product flows during a discharge cycle, the cycle gas leaving the reactor along with the product generally contains a significant volume of unreacted monomer. The loss of unreacted monomer constitutes an economic loss of the chemical reactant. Fluidizing gas may further include inert gases, for example, to control the dew point of the recycle gas and which also represents an economic loss each time the polymer product is removed from the reactor.

Previous systems that have been developed to minimize the loss of gas when the polymer product is removed tend to impede the removal of the solid product itself, relative to a reactor design not employing such a system. As a result, the entire polymerization process ultimately can be limited by the rate of product removal, rather than the depend on the rate of production. These production limitations in large, expensive reactors are highly undesirable.

Therefore, there exists a need for new product removal strategies that can help minimize the loss of reactor gases when the polymer product is removed, but which do not hinder the removal of the solid product during product discharge. There is also a need for product removal systems that can operate over a wide range of reactor parameters, without limiting the rate of production.

BRIEF SUMMARY OF THE INVENTION

This disclosure provides a method and apparatus for controlling product discharge from a fluidized bed reactor and for controlling, reducing, and/or minimizing the loss of the unreacted monomer and the fluidizing gas that results from removing the solid polymer product from the reactor. Fluidized bed reactors normally discharge resin through an Integrated Product Discharge System, or IPDS, which includes a set of valves and tanks configured to minimize the loss of reactor gas during resin discharge cycle from the reactor. In one aspect, minimizing cycle gas losses can be achieved by filling the product tank substantially completely with resin or overfilling the product tank to a defined, desirable level or resin, during the reactor discharge sequence. Maximizing resin fill in the product tank minimizes the reactor gas volume, thereby also minimizing the loss of discharge cycle gas while maximizing resin throughput. At the same time, overfilling the product tank to more than an acceptable amount can cause undesired blockages in the IPDS system and result in IPDS outages, which can reduce plant throughput as well as increase cycle gas losses.

The sequence times for controlling valves in an IPDS system typically must be adjusted manually, which require "trial-and-error" adjustments to maintain reliable operation. For example, the time that the product discharge valve is open during a discharge cycle, which controls the extent to which the product tank is filled or overfilled, is one parameter that normally is adjusted manually. In accordance with this disclosure, the product discharge valve is opened and closed for a controllable time period using a system that includes a detector for detecting the solid particulate product level, in conjunction with a control system and various control algorithms, which automatically adjust the pre-determined "valve-open" time period to attain the desired filled or overfilled level in the product tank. By describing the product tank as "filled," it is intended to refer to product being added to the product tank to about the maximum extent, about the 100% capacity level of the product tank, without substantial product overflow from the tank. By describing the product tank as "overfilled," it is intended to refer to product being added to the product tank to more than the 100% maximum capacity level of the product tank, such that product overflow from the tank into a vent line, overflow container, or the like, occurs to some desired extent. The terms "maximize" or "maximized" and the like are used herein to include both concepts of "filled" and "overfilled" such that particulate product is added to a product tank up to an acceptable or desirable level that includes both filled or overfilled to a desired extent.

Thus, in one aspect, the disclosure provides a method of removing a solid particulate product from a fluidized bed reactor together with gas from the fluidized bed reactor, in which a product tank is connected with the fluidized bed reactor through a fill valve and includes a means for emptying and a means for venting the product tank. The product tank or vent line comprises a detector capable of detecting the solid particulate product and a control system in communication with the detector and the fill valve and capable of controlling the fill valve. The detector is situated, for example at or near the top of the tank and/or contiguous with the vent line, such that the detector indicates when the product tank is filled or overfilled to a known level, for example within the vent line. A discharge cycle is performed by opening the fill valve for a pre-determined time period and transferring the solid particulate product and reactor gas into the product tank, then closing fill valve and emptying the tank. This discharge cycle is repeated any number of times, and the particular control algorithm employed calculates adjustments to be made and, in conjunction with the control system, adjusts the pre-determined time period. Any detector can be used that can detect the presence or absence of a solid particulate product at the level of the detector, as it is situated in the product tank and/or vent line, and the particular control algorithm can be selected on the basis of the type of response any specific detector will provide.

In one aspect, a detector that provides a simple binary response, depending upon whether solid particulate product is detected or not detected, can be employed. In this aspect, and by way of example, the fraction or percent of discharge cycles in which the solid particulate product is detected with the detector can be determined. As discharge cycles are carried out for the duration of the test period, a control algorithm can be used with the control system to adjust the pre-determined time period to increase or decrease the proportion of discharge cycles in which the solid particulate product is detected with the detector. As more discharge cycles are effected and sequential adjustments are made, the product tank may approach a substantially constant desired fill level during each product discharge cycle.

In another aspect, a detector that provides a scaled or proportional response to the presence of solid particulate product can be employed, including a detector that provides a peak value of the measured parameter. In this aspect, and by way of example, a detector that provides a peak density measurement can be used. A desired or target detector response value can be selected, along with minimum acceptable and maximum acceptable response values, and as discharge cycles are carried out for the duration of the test period, the control algorithm can calculate the average detector response value. At the end of the test period, the pre-determined time period can be adjusted, based on whether the average detector response value is at or below the minimum acceptable response value, at or above the maximum acceptable response values, or at or near the desired or target detector response value.

The method disclosed herein is especially useful for processes in which a product tank is rapidly filled and emptied as part of a sequenced operation, in which an appropriate, precise level of tank fill assists in maximizing and/or optimizing reactor throughput, while minimizing or optimizing loss of the unreacted monomer in the fluidizing gas. One type of sequenced operation in which the disclosed process can be used is disclosed in U.S. Pat. No. 6,255,411, which is hereby incorporated in its entirety by reference. In this aspect, the means for emptying the product tank typically comprises a downstream blow tank which is connected with the product tank through a discharge valve.

In another aspect of the disclosed process, there is provided a method of removing a solid particulate product from a fluidized bed reactor, in which two detectors capable of detecting the solid particulate product are employed with the product tank and/or vent line, along with a control system in communication with both detectors and the fill valve. In this method and apparatus, a first detector is situated to indicate when the product tank is filled or overfilled to a lower first level, and the second detector is situated to indicate when the product tank is overfilled to a higher second level. The detectors that can be used can be detectors that provide either a binary "on-off" response to the presence of solid particulate product, or a scaled or proportional response that provides a value proportion to some measured parameter.

In the two-detector aspect, and by way of example, using detectors with a binary response, as a discharge cycle is performed and repeated any number of times, the detectors and control system can determine the fraction or percent of discharge cycles in which the solid particulate product is detected at both the first and the second detectors. A control algorithm can be used with the control system to adjust the pre-determined time period to increase or decrease the proportion of discharge cycles in which the solid particulate product is detected with the first and the second detectors. By incorporating a second detector, typically higher in the vent line than the first detector which can be located several inches from the top of the product tank, more precise control of the fill level of the product tank can be attained. For example, using this two-detector method and apparatus, the pre-determined time period can be adjusted such that the solid particulate product is detected with the first detector about 100% of the discharge cycles, and the solid particulate product is detected with the second detector about 0% of the discharge cycles.

Further to the two-detector aspect, and by way of example, using detectors with a scaled or proportional response, as a discharge cycle is performed and repeated any number of times, a desired or target detector response value can be selected for each detector, along with minimum acceptable and maximum acceptable response values for each detector, although typically a minimum acceptable response value will be associated with the detector lower in the product tank or vent line and the maximum acceptable response value will be associated with the detector higher in the product tank or vent line. As discharge cycles are effected for the duration of a particular test period, the control algorithm can calculate the average detector response value. At the end of the test period, the pre-determined time period can be adjusted, based on whether the average detector response value is at or below the minimum acceptable response value, at or above the maximum acceptable response values, or below, above, or near the desired or target detector response values for each of the two detectors. This two-detector embodiment can be used, for example, for providing very fine adjustments to the level of the solid particulate resin product.

A number of reactor systems and fluidized bed product discharge designs have been described, examples of which are disclosed in U.S. Pat. Nos. 4,621,952, 4,003,712, 4,032, 391, 4,255,542, 4,302,565, and 4,535,134, each of which is hereby incorporated by reference in its entirety. It is anticipated that the apparatus and method of this disclosure can be utilized in conjunction with any of these reactor systems to sequentially adjust the discharge cycles, such that the product tank will approach a substantially constant desired fill level during each product discharge cycle.

DETAILED DESCRIPTION OF THE INVENTION

The present disclosure affords a method, apparatus, and system for improving the raw material efficiency of a fluidized bed reactor and plant throughput by improving the Integrated Product Discharge System (IPDS) fill efficiency using a new control methodology. For example, this disclosure helps address the problem of maintaining optimal operation of the product discharge in a fluidized bed polymerization reactor such as is used in the UNIPOL™ Gas Phase Technology and other processes, to maintain desired production rates while minimizing losses of cycle gas. The disclosed process and apparatus are applicable to all resin products such as polypropylene (PP) including isotactic polypropylene (iPP), high density polyethylene (HDPE), linear low density polyethylene (LLDPE) including metallocene-catalyzed linear low density polyethylene (mLLDPE), ethylene-propylene rubber (EPR), ethylene propylene diene rubber (EPDM), and the like. In accordance with this disclosure, the product discharge valve of a fluidized bed reactor is opened and closed for a controllable time period using a system that includes a detector, a control system, and various control algorithms, and the pre-determined "valve-open" time period is automatically adjusted to attain the desired fill level in the product tank.

According to this disclosure, a method of removing a solid particulate product from a fluidized bed reactor is provided, the method comprising:
(a) providing:
  (i) a product tank connected with a fluidized bed reactor through a fill valve and comprising a means for emptying and a means for venting;
  (ii) a detector that provides a response when a solid particulate product fills or overfills the product tank to the level of the detector; and
  (iii) a control system in communication with the detector and the fill valve and capable of controlling the fill valve;
(b) performing at least one discharge cycle comprising:
  (i) opening the fill valve for a pre-determined time period and transferring the solid particulate product together with gas from the fluidized bed reactor into the product tank; and
  (ii) after the pre-determined time period, closing the fill valve and emptying the product tank;
(c) while performing step (b), calculating a desired adjustment to the pre-determined time period using a control algorithm and at least one detector response or absence thereof obtained while performing at least one discharge cycle; and
(d) adjusting the pre-determined time period by the desired adjustment using the control system.

Typically, the means for venting the product tank is a vent line and the detector can be located in or contiguous to the vent line so as to detect solid particular product when it reaches a desired level within the vent line. When the detector is situated to detect product in the vent line, the product tank is overfilled to the level of the detector; that is, this configuration allows the detector to signal when the product overflow from the product tank into a vent line has occurred to some desired extent. In one aspect, the detector can be located any distance along the vent line from the junction of the vent line and the product tank. In one aspect, the detector can be located from as close as it is possible to mount near the top of the product tank, about 0.25 feet, to about 10 feet or even more from the junction of the vent line and the product tank. The location of the detector can vary as a function of the particular resin, and can vary over a wide range. For example, the more "sticky" or tacky resins which may be among the lower density resins (LDPE, EPR, and the like), usually have a lower detector position in the vent line or at the top of the product tank, to prevent clogging of the vent line. The less "sticky" or tacky resins which are generally among the higher density resins (HDPE and the like), can accommodate a higher detector position in the vent line because their presence several feet into the line likely will not lead to clogging or blockages in the IPDS system. Thus, the detector can be located in or on the vent line about 10 feet, about 9 feet, about 8 feet, about 7 feet, about 6 feet, about 5 feet, about 4 feet, about 3 feet, about 2 feet, about 1.5 feet, about 1 foot, about 0.5 feet, or about 0.25 feet from the junction of the vent line and the product tank. In another aspect, the detector can be located from about 0.25 to about 5.0 feet, from about 0.5 to about 3.0 feet, or about 0.75 to about 2.0 feet from the junction of the vent line and the product tank, to signal the product level at the desired level of overfill.

The disclosed process and apparatus also provide for a detector that is moveable or adjustable, to accommodate different heights within the vent line or product tank at which detection may be desired, as may be the case when producing different resins. When the detector is a nuclear density meter as described below, the radiation source and the detector portion of the density meter (for example, a Gamma detector) can be mounted opposite each other on the outside of the vent line such that the nuclear density meter operates in direct transmission mode, without the need for the detector probe to directly enter or breach the vent line. Therefore, a nuclear density meter adapts very well when an adjustable detector is desired. Other detectors, such as a photoelectric sensor may be used.

A further aspect of the disclosure provides that the detector can be located at or near the top of the product tank and not in the vent line, so as to detect product before it overfills the product tank into the vent line. Typically, in order to maximize resin fill in the product tank and minimize the reactor gas volume, the detector can be located as close to the top of the product tank as physically possible. However, the exact detector location is expected to vary as a function of the detector size, the required path length for the detection method, the particular construction of any vented branch line that may be used solely for mounting a detector, and similar factors that may affect or be required for detector operation. By way of example, when the detector is a nuclear density meter as disclosed herein, the radiation source and the detector portion of the density meter (for example, a Gamma detector) can be mounted adjacent to each other on the outside of the product tank, such that the nuclear density detector operates in backscatter mode, thereby allowing the detector to be situated high on the product tank.

In one aspect of the disclosed method, the fill valve is opened for a finite, pre-determined time period to transfer solid product into the product tank, after which the fill valve is closed and the product tank is emptied. Typically the pre-determined time period is adjusted to optimize the conservation of gas in the fluidized bed reactor, and any number of algorithms or programming logic can be used to adjust this pre-determined valve-open time period. In one aspect this disclosure provides for performing and repeating the discharge cycle any number of times and determining the proportion of discharge cycles in which the solid particulate product is detected by the detector. Therefore, steps (b) through (d) of the process recited above normally are repeated at least one time. While the multiple discharge and detection events are occurring, a control algorithm along with the control system are used to adjust the pre-determined time period to increase or decrease the proportion of discharge cycles in which the solid particulate product is detected with the detector. Therefore, it is envisioned that for all the discharge cycles within a given period, for example 1 or 2 hours, a certain fraction or percent of overfill events in the discharge cycles may be desirable. In this case, if an overfill event occurs some proportion of all the product discharge fills, then it is expected that resin fill in the product tank is maximized, yet because only a fraction of discharge cycles result in overfill it is unlikely that blockages in the IPDS system will occur.

In one aspect, a detector that provides a simple binary response, depending upon whether solid particulate product is detected or not detected, can be employed. By way or example, when this type detector is employed, the steps of calculating a desired adjustment to the pre-determined time and adjusting the pre-determined time period while performing at least one discharge cycle (corresponding to steps (c) and (d) of the above-disclosed method, can be implemented according to a control algorithm comprising the following steps:
(i) selecting a test period, $t_{TEST}$, comprising sufficient time to perform at least one discharge cycle;

(ii) selecting a desired percentage of discharge cycles, Percent$_{(TARGET)}$, in which the solid particulate product is detected with the detector;

(iii) selecting a number of seconds to decrease (x) and a number of seconds to increase (y) the pre-determined time period during which the fill valve is open;

(iv) for the duration of the test period, calculating the percentage of discharge cycles, Percent$_{(OBS)}$, in which the solid particulate product is detected with the detector;

(v) following the last discharge cycle of the test period, adjusting to the pre-determined time period as follows:
- (A) if Percent$_{(OBS)}$>Percent$_{(TARGET)}$, decreasing the pre-determined time period by x seconds;
- (B) if Percent$_{(OBS)}$<Percent$_{(TARGET)}$, increasing the pre-determined time period by y seconds; and
- (C) if Percent$_{(OBS)}$=Percent$_{(TARGET)}$, making no adjustment to the pre-determined time period;

(vi) repeating steps (iv) and (v) any number of times; and (vii) optionally adjusting $t_{TEST}$, Percent$_{(TARGET)}$, x, y, or any combination thereof after any step (v) or at any time during a test cycle.

This binary response algorithm strategy also can be employed using a scaled or proportional response detector, in which only a binary "yes-no" response is entered into the algorithm. For example, a nuclear density meter can be employed in conjunction with a binary response algorithm, using the detection or non-detection of solid product as the response.

In this aspect, the fraction or percent of resin detections in the total number of discharge events that can be used to initiate an adjustment to the pre-determined valve-open time can be any proportion or percent. For example, the controller can be programmed so that if the detector senses resin in a % of the total resin discharges for the previous time period, wherein a can be greater than or equal to about 1% and less than or equal to about 100% (that is, $1 \leq \alpha \leq 100$), then the controller can be set to decrease the fill valve open time by the desired time interval, typically by β seconds, wherein typically $0.1 \leq \beta \leq 2.0$ seconds. A decrease in fill time is used to allow less time for filling of the tank to provide a lower average peak tank level, Just as an increase in fill time is used to provide a higher average peak tank level. Further, the percent of the total resin discharges that can be used to initiate an adjustment, α %, can range from about 5 to about 90 percent, from about 10 to about 80 percent, from about 20 to about 70 percent, from about 30 to about 60 percent, or from about 40 to about 55 percent. Moreover, adjustments could be made to the proportion or percent α % itself as the reactor run proceeds according to a particular algorithm, to in order to more quickly adjust the resin fill and attain maximum product tank fill. For example, for the first 1-hour period monitoring period or for the first 20 discharge cycles, the percent of resin detections in the total number of discharge events that will initiate an adjustment to the pre-determined valve-open time (α) can be between about 10% to about 90%, for the second 1-hour period monitoring period or for the second 20 discharge cycles, α can be between about 25% to about 75%, and for the third and subsequent 1-hour period monitoring periods or for the third and subsequent 20 discharge cycles, α can be between about 25% to about 75%. These numbers are exemplary, as any number of algorithms can be used which would alter the values of α, depending upon the reactor parameters and the like.

The control system also could be programmed so that if the density meter did not detect product in γ % of the total resin discharges for the previous time period, wherein typically $1 \leq \gamma \leq 99$ and the time period can be about 1 hour, then the controller can increase the fill of the tank by increasing the fill valve open time by δ seconds, wherein typically $0.1 \leq \delta \leq 2.0$ seconds.

In a further aspect, a detector that provides a scaled or proportional response to the presence of solid particulate product can be employed, including a detector that provides a peak value of the measured parameter, can be employed. By way or example, when this type detector is employed, the steps of calculating a desired adjustment to the pre-determined time and adjusting the pre-determined time period while performing at least one discharge cycle (corresponding to steps (c) and (d) of the above-disclosed method, can be implemented according to a control algorithm comprising the following steps:

(i) selecting a test period, $T_{TEST}$, comprising sufficient time to perform at least one discharge cycle;

(ii) selecting a desired detector response value, $R_{TARGET}$, a minimum acceptable detector response value $R_{MIN}$, and a maximum acceptable detector response value $R_{MAX}$;

(iii) selecting a number of seconds to decrease (x) and a number of seconds to increase (y) the pre-determined time period during which the fill valve is open;

(iv) for the duration of the test period, calculating the average detector response, $R_{AVG}$, following each discharge cycle;

(v) following the last discharge cycle of the test period, adjusting to the pre-determined time period as follows:
- (A) if $R_{AVG} \geq R_{MAX}$, decreasing the pre-determined time period by x seconds;
- (B) if $R_{AVG} \leq R_{MAX}$, increasing the pre-determined time period by y seconds; and
- (C) if $R_{MIN} < R_{AVG} < R_{MAX}$, making no adjustment to the pre-determined time period;

(vi) repeating steps (iv) and (v) any number of times; and (vii) optionally adjusting $t_{TEST}$, $R_{TARGET}$, $R_{MIN}$, $R_{MAX}$, x, y, or any combination thereof after any step (v) or at any time during a test cycle.

In this aspect, the desired detector response value, $R_{TARGET}$, can be a peak density meter value, $\rho_{(PEAK)}$, obtained from a nuclear density meter measurement. Any one, any combination, or all of the algorithm parameters, $t_{TEST}$, $R_{TARGET}$, $R_{MIN}$, $R_{MAX}$, x, or y, can be adjusted at any time during a test cycle, as appreciated by one of ordinary skill. The time adjustments can differ, such that x can be greater than, less than, or equal toy. Typically, the number of seconds to decrease (x) the pre-determined time period can be greater than the number of seconds to increase (y) the pre-determined time period during which the fill valve is open, thus, x can be greater than y. This feature is useful to adjust the level of the solid product down faster than it is adjusted up. Moreover, as production continues and reactor production time increases, $t_{TEST}$ can adjusted upward at least one time upon repeating steps (iv) and (v) in the disclosed algorithm.

A number of other variations of programming logic or algorithms can be used to adjust the pre-determined time period or used to adjust other reactor and/or product discharge parameters according to the disclosure. For example, in one aspect, the control algorithm and the control system can adjust the pre-determined valve-open time period, the time between each discharge cycle, any number of reactor parameters, or any combination thereof, as understood by one of skill in the art, to optimize the conservation of gas in the fluidized bed reactor. Moreover, it is also envisioned that the parameter(s) to be adjusted, such as the pre-determined valve-open time, can be adjusted after any number of discharge cycles. Typically, it is desirable to monitor several discharge cycles, for example the discharge cycles that occur over a 1-hour time period to determine the proportion of overfill events in the discharge cycles, and adjust the pre-determined valve-open time only after the 1-hour monitoring period. It is also possible to monitor a given number of discharge cycles, for example from about 3 to about 20 discharge cycles, and base a calculated adjustment to the pre-determined valve-open time on the specific number of discharge cycles. Alternatively, adjustments could be made after only a single discharge cycle, in order to quickly adjust the valve-open time.

In a further aspect, any combination of programming logic such as the algorithms disclosed above, can be used. For example, starting from the first discharge cycle, adjustments could be made to the pre-determined valve-open time after each individual discharge cycle for about 5 to about 10 discharge cycles, after which an algorithm that monitors discharge cycles for a 1-hour period and adjust the pre-determined valve-open time after each 1-hour period could supplant the initial individual discharge cycle.

Still a further aspect of this disclosure relates to the time increment by which the pre-determined valve-open time is adjusted, whether the adjustment increases or decreases the pre-determined time. In this aspect, the control system can increase or decreased the pre-determined valve-open time by any time increment, for example a time adjustment ranging from about 0.05 seconds to about 5 seconds can be used. Further, this adjustment can also range from about 0.08 to about 3 seconds, or from about 0.1 to about 2 seconds. It is also not necessary that this increment itself be constant, as this increment can itself be varied over time, depending on the particular algorithm. For example purposes, for the first 1-hour period monitoring period or for the first 8 discharge cycles, the pre-determined time can be adjusted in 1-second increments, for the second 1-hour period monitoring period or for the second 8 discharge cycles, the pre-determined time can be adjusted in 0.3-second increments, and for any following discharge cycles, the pre-determined time can be adjusted in 0.3-second increments. Such a feature has the advantage of making more coarse adjustments in the early stages of a reactor run, while reactor parameters may still be reaching steady state conditions, after which more fine adjustments will be made when coarse adjustments are more likely to result in product tank underfilling or overfilling events.

An additional aspect of this disclosure relates to the detector. Any detector can be used that is capable of sensing the presence of solid particulate product in the product tank and/or vent line. Examples of suitable detectors include, but are not limited to, a nuclear density meter, a capacitance probe, a photoelectric sensor, an optical density meter, a differential pressure sensor, an acoustic sensor, or a vibrating probe, or any combination thereof in the multiple detector embodiments as described below, can be used. The nuclear density meter works well with this disclosed process. While not intending to be bound by theory, nuclear density meters use a radioactive isotope source such as $^{137}Cs$ that emits photons (usually Gamma rays) which radiate back to the detector, and can be adapted to detect solid product in the backscatter mode or in the direct transmission mode, depending upon the location of the isotope source relative to the detector. The presence of solid product between the radioactive isotope source and the detector (direct transmission) or adjacent to the radioactive isotope source and the detector (backscatter) will absorb radiation that can be detected. In one aspect, a single point nuclear level detector located in the product tank vent ("G") line, FIG. 1, in conjunction with an algorithm to adjust the pre-determined valve-open time such that the detector only detects product on a certain percentage of discharge cycles in a given period works well, although other algorithms such as those disclosed herein can also be used.

Figure 1:
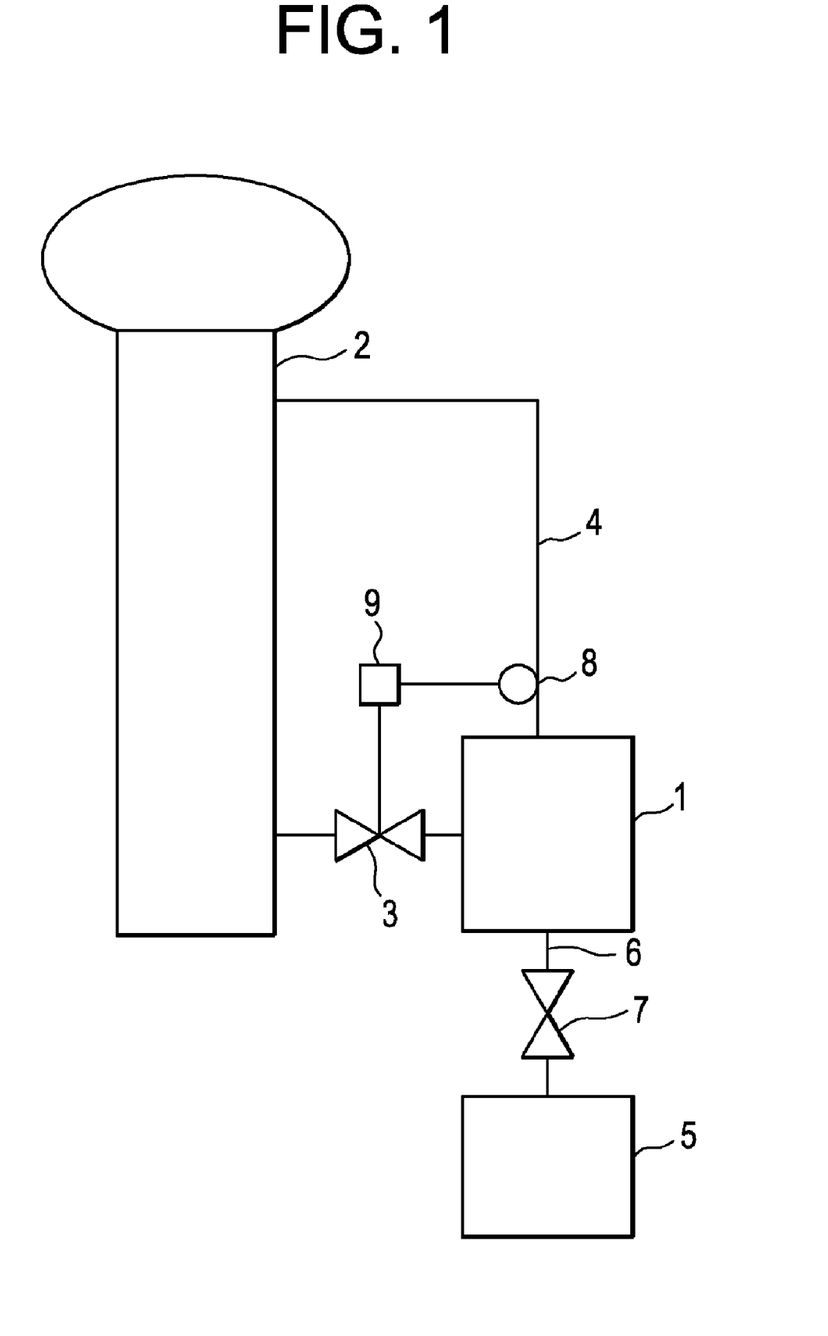
FIG. 1 is a simplified schematic of the product discharge system of the present disclosure, illustrating the detector and control system in communication with the product tank fill valve.

One of ordinary skill will understand that the figures provided herein are schematics that disclose, among other things, the connectivities of the various components for purposes of illustrating the disclosure, and are not necessarily limited to the particular orientation of the components as illustrated. FIG. 1 illustrates one aspect of the product discharge system of the present disclosure in simplified form, and shows the detector and control system in communication with the product tank fill valve. Other reactor components are not illustrated in this figure. The product tank 1 in FIG. 1 is connected with the fluidized bed reactor 2 through a fill valve 3, and comprises a means for venting, shown here as a vent "G" line 4 that, in this aspect, returns gas to the reactor 2. The product tank 1 also comprises a means for emptying the product tank, shown as a blow tank 5, which is connected to the product tank 1 through a blow tank line 6 and a blow tank valve 7. A detector 8, which can be, for example, a nuclear density meter, is contiguous with the vent "G" line 4 such that it is configured to detect with the solid resin product fills the vent "G" line 4 to the level of the detector 8. Detector 8 is in communication with the control system 9, which itself is also in communication with the product tank fill valve 3, and is capable of utilizing a control algorithm according to this disclosure to control the opening and closing of the product tank fill valve 3.

Figure 2:
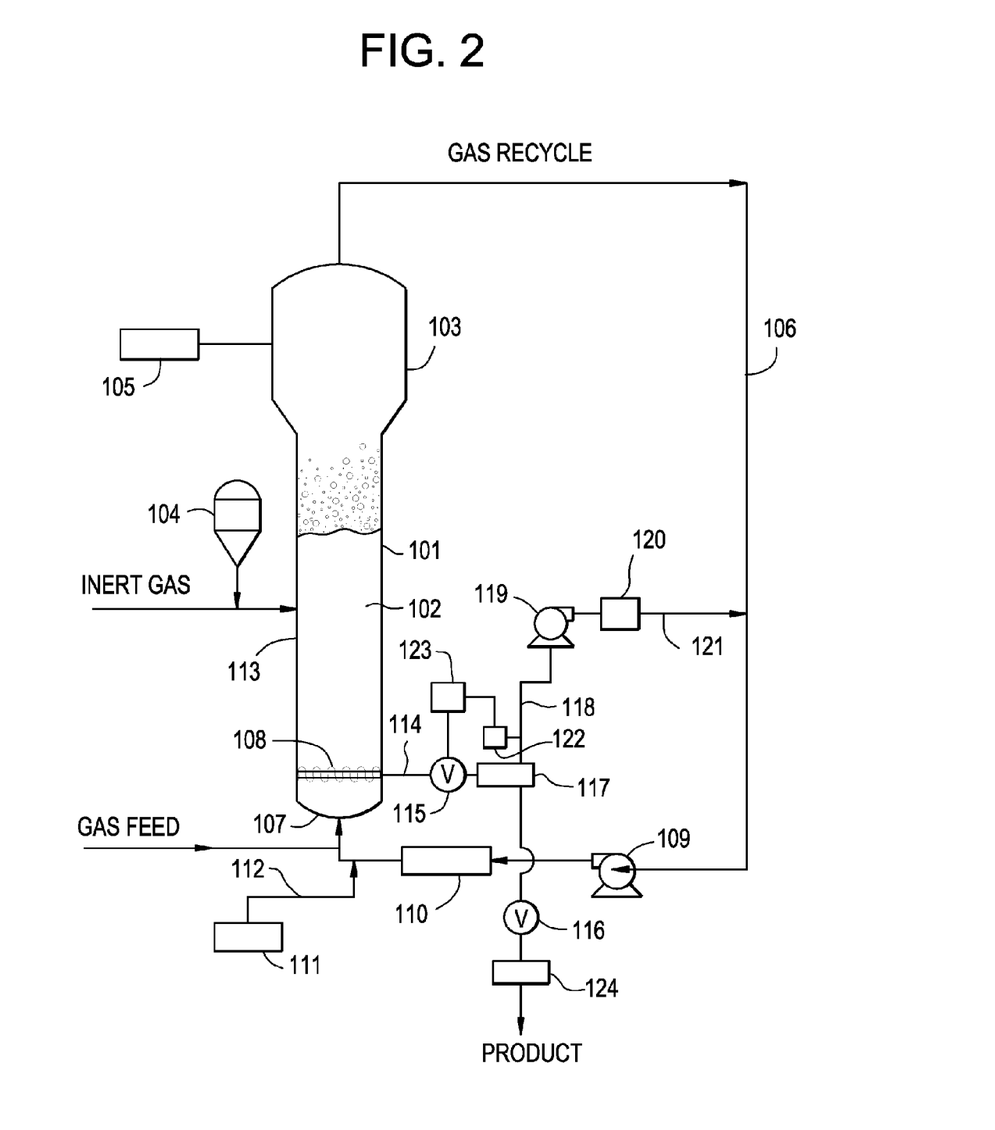
FIG. 2 is a schematic of a typical fluidized bed polymerization reactor system using the product discharge system of this disclosure.

FIG. 2 shows the basic overall operation of a fluidized bed reaction system, a type commonly used for making polyethylene, ethylene copolymers, and other olefin polymers, which uses the product discharge system of this disclosure. Referring to FIG. 2, the reactor 101 comprises a reaction zone 102 and a velocity reduction zone 103. The catalyst precursor or partially activated precursor composition used in the fluidized bed can be stored for service in a reservoir 104 under a blanket of a gas which is inert to the stored material, such as nitrogen or argon. Make-up gas is fed to the fluidized bed, and the composition of the make-up gas can be determined by a gas analyzer 105. Where desired, part of the make-up gas can be returned over gas recycle line 106 to the reactor at point 107 below the bed. There exists a gas distribution plate 108 above the point of return to aid fluidizing the bed.

The portion of the gas stream which does not react in the bed constitutes the recycle gas which typically is removed from the polymerization zone, preferably by passing it into a velocity reduction zone 103 above the bed where entrained particles are given an opportunity to drop back into the bed. The recycle gas is then compressed in a compressor 109 and then passed through a heat exchanger 110 wherein it is stripped of heat of reaction before it is returned to the bed. An activator compound typically is added to the reaction system downstream from heat exchanger 110 and as illustrated may be fed into the gas recycle system from dispenser 111 through line 112. The catalyst precursor or partially activated catalyst precursor composition typically is injected into the bed at a rate equal to its consumption at a point 113 which is above the distribution plate 108.

The particulate polymer product can be continuously withdrawn at a point 114 in suspension with a portion of the gas stream which is vented as the particles settle to minimize further polymerization and sintering when the particles reach their ultimate collection zone. The suspending gas may also be used to drive the product of one reactor to product tank 117. The particulate polymer product is conveniently and preferably withdrawn through the sequential operation of a pair of timed valves 115 and 116 upstream and downstream, respectively, of the product tank 117. Thus, valve 115 is a product tank fill valve and valve 116 is a blow tank fill valve, between the product tank 117 and the blow tank 124, which is a means for emptying the product tank 117. While valve 116 is closed, valve 115 is opened to emit a plug of gas and product to the product tank 117 between it and valve 115 which is then closed. The vented gas containing unreacted monomers may be recovered from product tank 117 through vent line 118. A detector 122, which can be, for example, a nuclear density meter, is contiguous and/or in communication with the vent line 118 and is capable of detecting the solid particulate product when the product fills the vent line 118 to the level of the detector 122. Detector 122 is in communication with the control system 123, which itself is also in communication with the product tank fill valve 115, and is capable of utilizing a control algorithm according to this disclosure to control the opening and closing of the product tank fill valve 115.

Valve 116 is then opened to deliver the product to the blow tank 124, which itself can be emptied by delivering the product to an even lower pressure zone. Valve 116 is then closed to await the next product recovery operation. The vented gas containing unreacted monomers may be recovered from zone 117 through line 118 and recompressed in compressor 119 and returned directly, or through a purifier 120, over line 121 to gas recycle line 106 at a point upstream of the recycle compressor 109.

This disclosure further provides a method of removing a solid particulate product from a fluidized bed reactor using a two-detector arrangement. In this aspect, a first detector is situated to indicate when the product tank is filled or overfilled to a lower first level, and the second detector is situated to indicate when the product tank is overfilled to a higher second level. The detectors can be either the binary "on-off" response detectors or the scaled or proportional response detectors as described. Thus, in accordance with this aspect of the disclosure, a method of removing a solid particulate product from a fluidized bed reactor is provided, the method comprising:

(a) providing:
  (i) a product tank connected with a fluidized bed reactor through a fill valve and comprising a means for emptying and a means for venting;
  (ii) a first detector that provides a response when a solid particulate product fills or overfills the product tank to a first level;
  (iii) a second detector that provides a response when a solid particulate product fills or overfills the product tank to a second level which is higher than the first level;
  (iv) a control system in communication with the detector and the fill valve and capable of controlling the fill valve;
(b) performing at least one discharge cycle comprising:
  (i) opening the fill valve for a pre-determined time period and transferring the solid particulate product together with gas from the fluidized bed reactor into the product tank; and
  (ii) after the pre-determined time period, closing the fill valve and emptying the product tank;
(c) while performing step (b), calculating a desired adjustment to the pre-determined time period using a control algorithm and at least one detector response or absence thereof from the first detector, the second detector, or both, obtained while performing at least one discharge cycle; and
(d) adjusting the pre-determined time period by the desired adjustment using the control system.

Typically, steps (b) through (d) of this process are repeated at least one time. Further, the pre-determined time period can be adjusted to either increase or decrease the pre-determined time period by any amount, but typically can be adjusted by an amount ranging from about 0.05 seconds to about 5 seconds. Moreover, the pre-determined time period can be adjusted after step (c) is carried out any number of time, but typically can be adjusted repeated after step (c) is carried out from about 3 to about 20 times.

Any algorithm or combination of algorithms that are disclosed herein can be employed to adjust the pre-determined time period. When using two detectors, the number of seconds to decrease (x) and the number of seconds to increase (y) the pre-determined time period can be calculated by an algorithm that considers only a single detector or both detectors. For example, when the pre-determined time should be decreased, decrease time (x) can be calculated from an algorithm that considers only the corresponding decrease time dictated by an algorithm that considers responses of the higher, second detector, just as any necessary increase time (y) can be calculated from an algorithm that considers only the corresponding decrease time dictated by an algorithm that considers responses of the lower, first detector. More complex algorithms that consider calculating (x) or (y) by scaling the detector responses for the upper and lower detectors are within the scope of this disclosure.

According to this aspect of the disclosed process and apparatus, by incorporating a second detector, typically higher in the vent line than the first detector which is located only several inches from the top of the product tank, more precise control of the fill level of the product tank can be attained. By way or example and similar to the single detector method, using a binary response detector, a control algorithm can be used with the control system to adjust the pre-determined time period to increase or decrease the proportion of discharge cycles in which the solid particulate product is detected with the first and the second detectors. For example, using this two-detector method and apparatus, the pre-determined time period can be adjusted such that the solid particulate product is detected with the first detector from about 90% to about 100% of the discharge cycles, and the solid particulate product is detected with the second detector from about 0% to about 10% of the discharge cycles. In another aspect, the pre-determined time period can be adjusted such that the solid product is detected with the first detector about 100% of the discharge cycles, while the solid particulate product is detected with the second detector about 0% of the discharge cycles. The means for venting the product tank typically is a vent line; therefore, the second detector usually is situated to detect resin product within the vent line, and the first detector can be situated to detect resin product within the product tank including at the top of the product tank or within the vent line. Typically, the pre-determined time period is adjusted to optimize the conservation of gas in the reactor.

In a further aspect, this disclosed process can be used in combination with other process that have been or are currently being employed to optimizing performance of the product discharge system by other means. For example, U.S. Pat. No. 6,255,411 describes the optimization of a product discharge system that is accomplished by adjusting the duration of each step within a complex product discharge time cycle. Time allocations for the functions of interest are determined by the timing of opening and closing valves, in which the valves are typically controlled by a digital controller, which is programmed to follow a specific sequence. The time spent in each of the steps in the sequence can be adjusted to provide for a desired rate of reactor discharge with minimal loss of cycle gas. The present disclosure can be used to optimize the first stage of such a complex product discharge cycle, by optimizing and/or maximizing the resin fill in each product tank.

Figure 3:
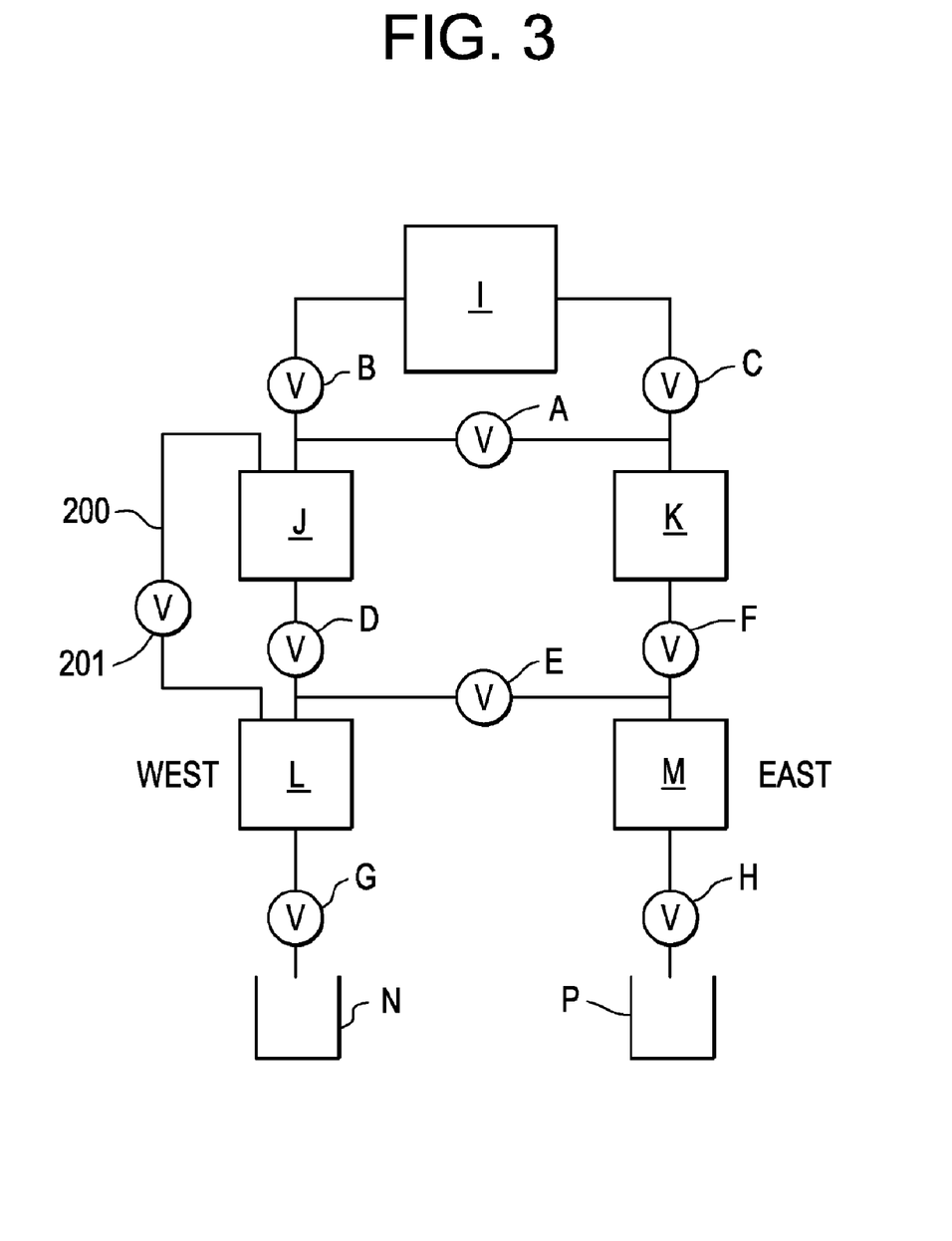
FIG. 3 is a schematic illustrating the tanks and valving for a diagrammatic description of product removal procedure according to U.S. Pat. No. 6,255,411, which can be utilized in combination with the product discharge system of this disclosure.

FIG. 3 illustrates the tanks and valve controls for a diagrammatic description of the product removal procedure according to U.S. Pat. No. 6,255,411, which is illustrated using dual product tanks but can be adapted to 3 or more product tanks as well. The product discharge control system of FIG. 3 can be utilized in combination with the product discharge system of this disclosure, which is not shown in FIG. 3. For purposes of explanation and illustration of FIG. 3, all valves A, B, C, D, E, F, C, and H initially are assumed to be closed. For illustration purposes, the product discharge sequence is begun by a control signal opening valve B or C. The solid product flows from the relatively high pressure reactor I into tank J or K, having a lower pressure, beginning movement of the solid particulate product through the right or left series of valves and tanks, as depicted, which may also be called the East-side and the West-side. Tanks J and K constitute the product tanks and tanks L and M and typically are called blow tanks. Product tanks J and K of FIG. 3 can be configured using the control method as disclosed herein and illustrated in FIG. 1 (but not illustrated in FIG. 3), to provide a highly efficient combination method for optimizing the conservation of reactor gases that include monomer. Thus, the product manipulation procedure described below that related to FIG. 3 is carried out while the method disclosed above for maximizing the fill level of the product tank as illustrated in FIG. 1 is carried out independently at both product tanks J and K.

Assuming that it was valve B that was opened to fill tank J with product, tank J now has a pressure approximating that of reactor I. Valve B is now closed and valve A is opened, allowing the pressures in tanks J and K to approach equilibrium. Valve A is then closed and valve D is opened, allowing the solid material to flow from tank J, where it had previously been deposited by the operation of valve B, into tank L. In addition to moving solid product, this tends to equilibrate the gas pressures in tanks J and L. Valve D is then closed and valve E is opened, allowing the pressure in tanks L and M to approach equilibrium by moving gas from tank L to tank M. Valve E is then closed and valve C is opened, allowing the solid to flow from tank L to the product bin N or other destination having a lower pressure, which may be a conveyor having a controlled pressure.

The complete discharge cycle in the product removal procedure of U.S. Pat. No. 6,255,411 as shown in FIG. 3 will include, after discharge of product, the similar movement in turn of product through the west-side or the east-side, whichever was used only for gas pressure equalization during the first five steps. Thus, after the system moves product through tanks J and L as described, additional solid product would now be moved from reactor I to tank K by opening valve C, valve C would then be closed and valve A would be opened to allow tank K to approach gas pressure equalization with tank J. Valve A would be closed and valve F opened to cause product to flow into tank M, valve F is closed and E opened to cause gas to flow into tank L from tank M; valve E is then closed and H is opened to send product to destination P. Thus there are five steps for each of the west-side and the east-side three product-moving steps with pressure equalizing steps between the first and second, and the second and third.

An optional feature shown on only one side of the product discharge system in FIG. 3 is a pipe 200 running between product tank J and blow tank L. Usually most of the product moves quite readily because its movement is assisted by a considerable pressure difference. When tank L approaches full, however, and the tank pressures approach equal, product movement depends more on gravity, and gas flow may tend actually to reverse as the displacement of gas by product becomes a significant effect. At this point, valve 201 may be opened to permit displaced gas to flow from blow tank L to product tank J. By permitting the displaced gas to flow through line 200, solid product falling from tank J to tank L does not have to overcome a counterflow of gas moving upwards from tank L, and the solid product movement will be accomplished sooner than otherwise would be the case. It is desirable not only that the product be moved as quickly as the equipment permits, but that the receiving tank be as full as possible. The operation of valve 201 may be in response to a signal representing a predetermined pressure difference between tanks J and L. A similar line and valve can be run between tanks K and M, between reactor I and tank K, and/or between tank J and reactor I. Such lines may be used on both sides of the discharge system. Also, movement of solid product through valve G and/or H may be assisted, particularly near the end of the operation, by adding gas to tank L or M from a source having a higher pressure than the current pressure in destination N or P.

Thus, in accordance with this aspect of this disclosure, a method of removing a solid particulate product from a fluidized bed reactor, the method comprising:

(a) providing multiple parallel series of tanks comprising a first product tank, a first blow tank, a second product tank, and a second blow tank, wherein:
  (i) each product tank is connected with the fluidized bed reactor through a fill valve and comprises a means for emptying and a means for venting;
  (ii) a detector is provided for each product tank to provide a response when a solid particulate product fills or overfills the product tank to the level of the detector;
  (iii) a control system is provided for each product tank in communication with the detector and the fill valve and capable of controlling the fill valve;

(b) for one parallel series of tanks, transferring the solid particulate product together with the gas from the reactor into the first product tank by:
  (i) opening the fill valve for a pre-determined time period and transferring the solid particulate product together with gas from the fluidized bed reactor into the first product tank;
  (ii) after the pre-determined time period, closing the fill valve and emptying the first product tank;

(c) while performing (b), transferring solid particulate product from the second product tank to the second blow tank;

(d) while performing (b) and (c), transferring solid particulate product from the first blow tank to a further destination having a pressure lower than the first blow tank;

(e) after performing (b), (c), and (d), passing gas from the first product tank to the second product tank;

(f) passing gas from the second blow tank to the first blow tank;

wherein each of (b), (c), (d), (e), and (f) are isolated by closed valves from any of the reactor, the product tanks, and the blow tanks not necessary for the performance thereof;

(g) repeating steps (b)-(f) for each remaining parallel series of tanks;

(h) repeating steps (b)-(g) any number of times and for each product tank independently calculating a desired adjustment to the pre-determined time period using a control algorithm and at least one detector response or absence thereof for that product tank, obtained while performing step (b) for that product tank; and (i) adjusting the pre-determined time period for each product tank independently by the desired adjustment using the control system.

When using detectors in the tanks and/or vent lines that provide scaled or proportional responses to the presence of solid resin, the steps of calculating a desired adjustment to the pre-determined time and adjusting the pre-determined time period while performing at least one discharge cycle can be implemented according to a control algorithm comprising the following steps:

(i) selecting a test period, $t_{TEST}$, comprising sufficient time to perform at least one discharge cycle;

(ii) selecting a desired detector response value, $R_{TARGET}$, a minimum acceptable detector response value $R_{MIN}$, and a maximum acceptable detector response value $R_{MAX}$;

(iii) selecting a number of seconds to decrease (x) and a number of seconds to increase (y) the pre-determined time period during which the fill valve is open;

(iv) for the duration of the test period, calculating the average detector response, $R_{AVG}$, following each discharge cycle;

(v) following the last discharge cycle of the test period, adjusting to the pre-determined time period as follows:

(A) if $R_{AVG} \geq R_{MAX}$, decreasing the pre-determined time period by x seconds;

(B) if $R_{AVG} \leq R_{MIN}$, increasing the pre-determined time period by y seconds; and (C) if $R_{MIN} < R_{AVG} < R_{MAX}$, making no adjustment to the pre-determined time period;

(vi) repeating steps (iv) and (v) any number of times; and (vii) optionally adjusting $t_{TEST}$, $R_{TARGET}$, $R_{MIN}$, $R_{MAX}$, x, y, or any combination thereof after any step (v) or at any time during a test cycle.

The particular algorithm(s) and adjustments to the parameters $t_{TEST}$, $R_{TARGET}$, $R_{MIN}$, $R_{MAX}$, x, and/or y, include at least those that algorithms and adjustments that can be used in conjunction with the discharge optimization system on a single product tank reactor.

In this aspect of the present disclosure, the number of parallel series of tanks that can be accommodated is not limited to the discharge method of gas equilibration or of detecting the fill level of resin in the product tank. Thus, while FIG. 3 illustrates two parallel series of tanks and FIGS. 1 and 2 illustrate the method and apparatus for minimizing the loss of the fluidizing gas in a single product tank, two or more parallel series of product tanks are encompassed by this disclosure. In this aspect, 2, 3, 4, 5, 6, or more parallel series of tanks can be utilized.

The present disclosed process is further illustrated by the following examples, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present disclosure or the scope of the appended claims. Thus, other aspects of this disclosed process and apparatus will be apparent to those skilled in the art from consideration of the specification provided herein.

Unless indicated otherwise, when a range of any type is disclosed or claimed, for example a range of distance or length, percent or frequency, number of discharge cycles, or time periods, it is intended to disclose or claim individually each possible number that such a range could reasonably encompass, including any sub-ranges encompassed therein. For example, when the Applicants disclose or claim an adjustment in time from about 0.1 to about 2 seconds, Applicants' intent is to disclose or claim individually every possible number that such a range could encompass, consistent with the disclosure herein. Thus, by the disclosure that a time adjustment can range from about 0.1 to about 2 seconds, Applicants intent is to recite that the time adjustment can be about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, or about 2.0 seconds, including any ranges, sub-ranges, or combinations thereof between any disclosed times. Accordingly, Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants are unaware of at the time of the filing of the application.

All publications and patents mentioned in the disclosure are incorporated herein by reference in their entireties, for the purpose of describing and disclosing, for example, the constructs and methodologies that are described in the publications, which might be used in connection with the presently described process and apparatus. The publications discussed above and throughout the text are provided solely for their disclosure prior to the filing date of the present application. Nothing herein is to be construed as an admission that the inventors are not entitled to antedate such disclosure by virtue of prior invention. Should the usage or terminology used in any reference that is incorporated by reference conflict with the usage or terminology used in this disclosure, the usage and terminology of this disclosure controls. The Abstract of the disclosure is provided herewith to satisfy the requirements of 37 C.F.R. §1.72 and the purpose stated in 37 C.F.R. §1.72 (b) "to enable the United States Patent and Trademark Office and the public generally to determine quickly from a cursory inspection the nature and gist of the technical disclosure." The Abstract is not intended to be used to construe the scope of the appended claims or to limit the scope of the subject matter disclosed herein. Any use of the past tense to describe an example otherwise indicated as constructive or prophetic is not intended to reflect that the constructive or prophetic example has actually been carried out.

EXAMPLES

Examples 1-5

Discharge Sequence Using a Scaled Response Detector and Algorithm

As illustrated in FIG. 1, a single point nuclear detector density meter was installed in the lower section of the tank vent (G-line) approximately 8-10 inches from the top of the product tank. A control system was installed so that it was in communication with the detector and the product tank fill valve. The controller was programmed with the following parameters: $t_{TEST}$, $R_{TARGET}$, $R_{MIN}$, $R_{max}$, x, and y, where $t_{TEST}$ is the test period and is sufficient time to perform at least one discharge cycle; $R_{TARGET}$ is the desired detector response value, which in this example is a peak density $\rho_{(PEAK)}$; $R_{MIN}$ is the minimum acceptable detector response value or $\rho_{(MIN)}$; $R_{MAX}$ is the maximum acceptable detector response value or $\rho_{(MAX)}$; wherein $\rho_{(MIN)}$ and $\rho_{(MAX)}$ define a "deadband" within which adjustments to the pre-determined time typically will not be made; x is the number of seconds to decrease the pre-determined time period during which the fill valve is open; and y is the number of seconds to increase the pre-determined time period during which the fill valve is open.

Example 1 are actual parameters that were used in practice, and Examples 2-5 are constructive examples.

Discharge was carried out in the usual way, except that adjusting the pre-determined time period while performing at least one discharge cycle was implemented according to a control algorithm comprising the following steps. Using a $t_{TEST}$ of one hour, for the duration of the test period, the average detector response, $R_{AVG}$, was calculated following each discharge cycle. After the final discharge cycle of the test period, the adjusting to the pre-determined time period was calculated as follows:

(A) if $R_{AVG} \geq R_{MAX}$, decreasing the pre-determined time period by x seconds;

(B) if $R_{AVG} \leq R_{MIN}$, increasing the pre-determined time period by y seconds; and (C) if $R_{MIN} < R_{AVG} < R_{MAX}$, making no adjustment to the pre-determined time period.

The process was repeated for additional test periods. Typical or sample values of $t_{TEST}$, $R_{TARGET}$, $R_{MIN}$, $R_{MAX}$, x and y are illustrated in Table 1.

TABLE 1

Actual and Constructive Examples of Product Discharge Examples Using a Scaled Response Detector and Algorithm

| Example | $t_{TEST}$ | $R_{TARGET}$ $\rho_{(PEAK)}$ | $R_{MIN}$ $\rho_{(MIN)}$ | $R_{MAX}$ $\rho_{(MAX)}$ | x (sec) | y (sec) |
|---|---|---|---|---|---|---|
| 1 | 1 hr | 0.5 | 0.3 | 0.7 | 1 | 0.5 |
| 2 (const) | 0.5 hr | 0.60 | 0.45 | 0.75 | 0.7 | 0.5 |
| 3 (const) | 1 hr | 1.0 | 1.1 | 0.9 | 0.5 | 0.2 for first 0.5 h, then 0.4 thereafter |
| 4 (const) | 0.25 hr for first hour, then 1 hr thereafter | 0.5 | 0.4 | 0.6 | 0.5 | 0.5 |
| 5 (const) | 0.5 hr for first hour, then 0.75 hr thereafter | 0.5 | 0.3 | 0.7 | 0.4 | 0.2 for first 1 h, then 0.4 thereafter |

Example 6

Constructive Example of Discharge Sequence Using a Binary Response Algorithm

As disclosed, a binary response algorithm strategy can be employed using a scaled or proportional response detector, in which only a binary "yes-no" response is entered into the algorithm.

As illustrated in FIG. 1, a single point nuclear detector density meter could be installed in the lower section of the tank vent (G-line) approximately 8-10 inches from the top of the product tank. A control system containing logic that counts the number of times in a given time period (for example, 1 hour) that the resin fills the product chamber high enough to reach the nuclear density meter and provide a peak density could be installed so that it was in communication with the detector and the product tank fill valve. Thus, even though a proportional response can be obtained from the nuclear detector density meter, only the binary response that resin solid is, or is not, detected at the level of the detector can be used. The controller could be programmed so that if the density meter sensed resin in α % of the total resin discharges for the previous time period, wherein typically 1<α<90, then the controller decreased the fill valve open time by a time interval β seconds, wherein typically 0.1<β<2.0 seconds. The decrease in fill time allowed less time for filling of the tank and a lower average peak tank level. The control system also could be programmed so that if the density meter did not detect product in γ % of the total resin discharges for the previous time period, wherein typically 1<γ<90 and the time period was 1 hour, then the controller increased the fill of the tank by increasing the fill valve open time by δ seconds, wherein typically 0.1<δ<2.0 seconds.

In another aspect, the parameters β and δ which are time parameters in the operations described above can be a function of (for example, proportional to) the error from the desired fill level.

We claim:

1. A method of removing a solid particulate product from a fluidized bed reactor, the method comprising:
   (a) providing:
      (i) a product tank connected with a fluidized bed reactor through a fill valve and wherein the product tank comprises a discharge valve for emptying and a vent line for venting;
      (ii) a detector that provides a response when a solid particulate product fills or overfills the product tank to the level of the detector; and
      (iii) a control system in communication with the detector and the fill valve and capable of controlling the fill valve;
   (b) performing at least one discharge cycle comprising:
      (i) opening the fill valve for a pre-determined time period and transferring the solid particulate product together with gas from the fluidized bed reactor into the product tank; and
      (ii) after the pre-determined time period, closing the fill valve and emptying the product tank;
   (c) while performing step (b), calculating a desired adjustment to the pre-determined time period using a control algorithm and at least one detector response or absence thereof obtained while performing at least one discharge cycle; and
   (d) adjusting the pre-determined time period by the desired adjustment using the control system.

2. The method according to claim 1, wherein steps (c) and (d) are implemented according to a control algorithm comprising the following steps:
   (i) selecting a test period, $t_{TEST}$, comprising sufficient time to perform at least one discharge cycle;
   (ii) selecting a desired detector response value, $R_{TARGET}$, a minimum acceptable detector response value $R_{MIN}$, and a maximum acceptable detector response value $R_{MAX}$;

(iii) selecting a number of seconds to decrease (x) and a number of seconds to increase (y) the pre-determined time period during which the fill valve is open;
(iv) for the duration of the test period, calculating the average detector response, $R_{AVG}$, following each discharge cycle;
(v) following the last discharge cycle of the test period, adjusting to the pre-determined time period as follows:
(A) if $R_{AVG} \geq R_{MAX}$, decreasing the pre-determined time period by x seconds;
(B) if $R_{AVG} \leq R_{MIN}$, increasing the pre-determined time period by y seconds; and
(C) if $R_{MIN} < R_{AVG} < R_{MAX}$, making no adjustment to the pre-determined time period;
(vi) repeating steps (iv) and (v) any number of times; and
(vii) optionally adjusting $t_{TEST}$, $R_{TARGET}$, $R_{MIN}$, $R_{MAX}$, x, y, or any combination thereof after any step (v) or at any time during a test cycle.

3. The method according to claim 1, wherein steps (c) and (d) are implemented according to a control algorithm comprising the following steps:
(i) selecting a test period, $t_{TEST}$, comprising sufficient time to perform at least one discharge cycle;
(ii) selecting a desired percentage of discharge cycles, $Percent_{(TARGET)}$, in which the solid particulate product is detected with the detector;
(iii) selecting a number of seconds to decrease (x) and a number of seconds to increase (y) the pre-determined time period during which the fill valve is open;
(iv) for the duration of the test period, calculating the percentage of discharge cycles, $Percent_{(OBS)}$, in which the solid particulate product is detected with the detector;
(v) following the last discharge cycle of the test period, adjusting to the pre-determined time period as follows:
(A) if $Percent_{(OBS)} > Percent_{(TARGET)}$, decreasing the pre-determined time period by x seconds;
(B) if $Percent_{(OBS)} < Percent_{(TARGET)}$, increasing the pre-determined time period by y seconds; and
(C) if $Percent_{(OBS)} = Percent_{(TARGET)}$, making no adjustment to the pre-determined time period;
(vi) repeating steps (iv) and (v) any number of times; and
(vii) optionally adjusting $t_{TEST}$, $Percent_{(TARGET)}$, x, y, or any combination thereof after any step (v) or at any time during a test cycle.

4. The method according to claim 1, further comprising:
within step (c), further determining:
(i) the time between discharge cycles, and
(ii) the number of discharge cycles within a known time period; and
within step (d), further using the control algorithm and the control system to adjust the pre-determined time period, the time between discharge cycles, the number of discharge cycles within a known time period, or any combination thereof, to optimize the conservation of gas in the reactor.

5. A method of removing a solid particulate product from a fluidized bed reactor, the method comprising:
(a) providing:
(i) a product tank connected with a fluidized bed reactor through a fill valve and wherein the product tank comprises a discharge valve for emptying and a vent line for venting;
(ii) a first detector that provides a response when a solid particulate product fills or overfills the product tank to a first level;
(iii) a second detector that provides a response when a solid particulate product fills or overfills the product tank to a second level which is higher than the first level; and
(iv) a control system in communication with the detector and the fill valve and capable of controlling the fill valve;
(b) performing at least one discharge cycle comprising:
(i) opening the fill valve for a pre-determined time period and transferring the solid particulate product together with gas from the fluidized bed reactor into the product tank; and
(ii) after the pre-determined time period, closing the fill valve and emptying the product tank;
(c) while performing step (b), calculating a desired adjustment to the pre-determined time period using a control algorithm and at least one detector response or absence thereof from the first detector, the second detector, or both, obtained while performing at least one discharge cycle; and
(d) adjusting the pre-determined time period by the desired adjustment using the control system.

6. The method according to claim 5, wherein the pre-determined time period is adjusted such that the solid particulate product is detected with the first detector from about 90% to about 100% of the discharge cycles, and the solid particulate product is detected with the second detector from about 0% to about 10% of the discharge cycles.

7. A method of removing a solid particulate product from a fluidized bed reactor, the method comprising:
(a) providing multiple parallel series of tanks comprising a first product tank, a first blow tank, a second product tank, and a second blow tank, wherein:
(i) each product tank is connected with the fluidized bed reactor through a fill valve and wherein the product tank comprises a discharge valve for emptying and a vent line for venting;
(ii) a detector is provided for each product tank to provide a response when a solid particulate product fills or overfills the product tank to the level of the detector; and
(iii) a control system is provided for each product tank in communication with the detector and the fill valve and capable of controlling the fill valve;
(b) for one parallel series of tanks, transferring the solid particulate product together with the gas from the reactor into the first product tank by:
(i) opening the fill valve for a pre-determined time period and transferring the solid particulate product together with gas from the fluidized bed reactor into the first product tank;
(ii) after the pre-determined time period, closing the fill valve and emptying the first product tank;
(c) while performing (b), transferring solid particulate product from the second product tank to the second blow tank;
(d) while performing (b) and (c), transferring solid particulate product from the first blow tank to a further destination having a pressure lower than the first blow tank;
(e) after performing (b), (c), and (d), passing gas from the first product tank to the second product tank;
(f) passing gas from the second blow tank to the first blow tank;
wherein each of (b), (c), (d), (e), and (f) are isolated by closed valves from any of the reactor, the product tanks, and the blow tanks not necessary for the performance thereof;

(g) repeating steps (b)-(f) for each remaining parallel series of tanks;
(h) repeating steps (b)-(g) any number of times and for each product tank independently calculating a desired adjustment to the pre-determined time period using a control algorithm and at least one detector response or absence thereof for that product tank, obtained while performing step (b) for that product tank; and
(i) adjusting the pre-determined time period for each product tank independently by the desired adjustment using the control system.

8. The method according to claim 7, wherein steps (h) and (i) are implemented for each product tank independently according to a control algorithm comprising the following steps:
   (i) selecting a test period, $t_{TEST}$, comprising sufficient time to perform at least one discharge cycle;
   (ii) selecting a desired detector response value, $R_{TARGET}$, a minimum acceptable detector response value $R_{MIN}$, and a maximum acceptable detector response value $R_{MAX}$;
   (iii) selecting a number of seconds to decrease (x) and a number of seconds to increase (y) the pre-determined time period during which the fill valve is open;
   (iv) for the duration of the test period, calculating the average detector response, $R_{AVG}$, following each discharge cycle;
   (v) following the last discharge cycle of the test period, adjusting to the pre-determined time period as follows:
      (A) if $R_{AVG} \geq R_{MAX}$, decreasing the pre-determined time period by x seconds;
      (B) if $R_{AVG} \leq R_{MIN}$, increasing the pre-determined time period by y seconds; and
      (C) if $R_{MIN} < R_{AVG} < R_{MAX}$, making no adjustment to the pre-determined time period;
   (vi) repeating steps (iv) and (v) any number of times; and
   (vii) optionally adjusting $t_{TEST}$, $R_{TARGET}$, $R_{MIN}$, $R_{MAX}$, x, y, or any combination thereof after any step (v) or at any time during a test cycle.

\* \* \* \* \*